United States Patent
Jang et al.

(10) Patent No.: US 8,582,661 B2
(45) Date of Patent: Nov. 12, 2013

(54) BITSTREAM DECODING DEVICE HAVING RECONFIGURABLE FUNCTIONAL UNITS AND A CORRESPONDING DECODING METHOD

(75) Inventors: Euee-Seon Jang, Seoul (KR);
Sun-Young Lee, Seoul (KR);
Hyun-Gyu Kim, Seoul (KR);
Chung-Ku Lee, Incheon (KR)

(73) Assignee: Humax Co., Ltd., Seongnam-Si (KR)

( * ) Notice: Subject to any disclaimer, the term of this patent is extended or adjusted under 35 U.S.C. 154(b) by 530 days.

(21) Appl. No.: 12/580,867

(22) Filed: Oct. 16, 2009

(65) Prior Publication Data
US 2010/0054342 A1 Mar. 4, 2010

Related U.S. Application Data

(63) Continuation of application No. PCT/KR2008/002179, filed on Apr. 17, 2008.

(30) Foreign Application Priority Data

Apr. 17, 2007 (KR) .................. 10-2007-0037432

(51) Int. Cl.
*H04B 1/66* (2006.01)
*H04N 7/12* (2006.01)
*H04N 11/02* (2006.01)
*H04N 11/04* (2006.01)

(52) U.S. Cl.
USPC ............ 375/240.25; 375/240.01; 375/240.02; 375/240.08; 375/240

(58) Field of Classification Search
None
See application file for complete search history.

(56) References Cited

U.S. PATENT DOCUMENTS

| 5,452,006 A * | 9/1995 | Auld ..................... 375/240.26 |
| 6,721,923 B2 * | 4/2004 | Fisher ....................... 716/103 |
| 7,848,407 B2 * | 12/2010 | Yoon ..................... 375/240.01 |
| 2006/0227881 A1 * | 10/2006 | Gordon ................. 375/240.25 |
| 2007/0143664 A1 * | 6/2007 | Fang et al. ................... 715/513 |
| 2008/0077606 A1 * | 3/2008 | Fang et al. ................... 707/101 |

FOREIGN PATENT DOCUMENTS

| JP | 08-256063 | * | 10/1996 |
| JP | 08-256063 A | | 10/1996 |
| JP | 2002-245448 A | | 8/2002 |
| JP | 2005-510920 A | | 4/2005 |
| KR | 10/2005-00111329 | | 11/2005 |
| WO | WO-00/14967 A1 | | 3/2000 |

OTHER PUBLICATIONS

"RVC Textual Description 2.0," ITU Study Group 16, No. N8041, Apr. 7, 2006, XP030014533, Montreux, pp. 1-7.
Devillers et al., "Bitstream Syntax Definition Language (BSDL)," ITU Study Group 16, No. M7433, Jul. 10, 2001, XP030036540, pp. 1-14.

(Continued)

*Primary Examiner* — Joseph Ustaris
*Assistant Examiner* — Edemio Navas, Jr.
(74) *Attorney, Agent, or Firm* — Birch, Stewart, Kolasch & Birch, LLP (57) ABSTRACT

Disclosed are a bitstream decoding device and a method thereof. The decoding device can include a parser, configured to receive schema information for analyzing a bitstream and convert the bitstream to a meaningful datum to output the datum; and a decoding solution, configured to output a video datum by performing a bitstream decoding by use of the datum. With the present invention, it is possible to decode the bitstream encoded in various ways according to each standard by using the same information recognizing method.

11 Claims, 8 Drawing Sheets

(56) References Cited

OTHER PUBLICATIONS

Jang et al., "Reshaping Digital Media Business Models by Reconfigurable Video Coding," ITU Study Group 16, No. M13907, Oct. 17, 2006, XP030042575, pp. 1-5.

Study of Reconfigurable Video Coding V2.0, ITU Study Group 16—Video Coding Experts Group, No. N8040, Apr. 7, 2006, Montreux, XP030014532, pp. 1-23.

Working Draft 1.0 of Reconfigurable Video Coding (RVC), ITU Study Group 16—Video Coding Experts Group, No. N8260, Jul. 28, 2006, Klagenfurt, AT, XP030014752.

Compact Representation of Decoder Description for MPEG Reconfigurable Video Coding, Hyungyu Kim, Hanyang University.

Korean Office Action for Korean Patent Application No. 10-2007-0037434 dated Apr. 16, 2013.

* cited by examiner

BITSTREAM DECODING DEVICE HAVING RECONFIGURABLE FUNCTIONAL UNITS AND A CORRESPONDING DECODING METHOD

This application is a Continuation of PCT/KR2008/002179 filed on Apr. 17, 2008, and claims priority under 35 U.S.C. §119(a) on Patent Application No. 10-2007-0037432 filed in the Republic of Korea on Apr. 17, 2007, respectively, all of which are hereby expressly incorporated by reference into the present application.

TECHNICAL FIELD

The present invention relates to a bitstream decoding device and a method thereof, more specifically to a bitstream decoding device and a method thereof that uses a BSDL (boundary scan description language) schema.

BACKGROUND ART

Typically, a video is converted to a bitstream by an encoder. At this time, the bitstream is stored depending on a coding type that satisfies the constraint condition of the encoder.

MPEG requests syntax and semantics, which are the constraint condition of the encoder.

The syntax, which refers to the structure, format, or length of data, shows the sequence of expressing the data. In other words, the syntax is to meet a rule for encoding/decoding and defines the sequence and length of each element of the bitstream and a corresponding data format.

The semantics refers to the meaning of each bit that constitutes data. In other words, the semantics shows the meaning of each element of the bitstream.

Accordingly, the bitstream can be generated in various types depending on the encoding condition or the applied standard (or codec) of the encoder. Typically, each standard (e.g. MPEG-1, MPEG-2, MPEG-4 and MPEG-4 AVC) has different bitstream syntaxes.

Accordingly, it may be considered that the bitstream encoded according to each standard or encoding condition has different types (i.e. syntax and semantics). A decoder corresponding to a pertinent encoder must be used to perform the decoding of the bitstream.

As described above, the conventional bitstream decoder has a restriction that must satisfy the constraint condition of the encoder. This restriction makes it difficult to realize an integration decoder corresponding to a plurality of standards.

DISCLOSURE

Technical Problem

Accordingly, the present invention, which is contrived to solve the aforementioned problems, provides a bitstream decoding device and a method thereof that can decode a bitstream encoded in various types (syntaxes and semantics) in accordance with each standard (e.g. MPEG-1, MPEG-2, MPEG-4 and MPEG-4 AVC) by using the same information recognizing method.

Also, the present invention provides a bitstream decoding device and a method thereof that can parse a bitstream compressed in various methods by using the same information analyzing method and organically control each functional unit to perform the decoding by using the parsed data.

The present invention provides a bitstream decoding device and a method thereof that can commonly apply a syntax analyzing method for decoding various types of bit streams.

The present invention provides a bitstream decoding device and a method thereof that can easily decode a bitstream when a syntax element is changed, added or deleted.

The present invention provides a bitstream decoding device and a method thereof that can allow some elements used to decode a bit stream to share the element information of analyzed syntax (i.e. a result from syntax parsing).

The present invention provides a bitstream decoding device and a method thereof that can allow the element information of analyzed syntax to be used to analyze the syntax element of a following bit stream.

The present invention provides a bitstream decoding device and a method thereof that can group various functions constituting decoding methods suggested by a variety of standards (or codec) according to each functional unit to put the grouped functions in a toolbox.

The present invention provides a bitstream decoding device and a method thereof that can selectively load some functional units necessary for a toolbox and allow a corresponding predetermined process to be performed in order to decode a bitstream encoded in various forms.

The present invention provides a bitstream decoding device and a method thereof that can change, add or delete the functional units equipped in a toolbox.

In addition, the present invention provides a bitstream decoding device and a method thereof that can internationally standardize the concept and structure of codec integration for bitstream decoding. Other problems that the present invention solves will become more apparent through the following description.

Technical Solution

To solve the above problems, an aspect of the present invention features an encoder/a decoder and/or an integrated codec apparatus that can be universally used for various standards.

According to an embodiment of the present invention, the decoding device can include a parser, configured to receive a schema information for analyzing a bitstream and convert the bitstream to a meaningful datum to output the datum; and a decoding solution, configured to output a video datum by performing a bitstream decoding by use of the datum.

The decoding device can further include a toolbox, configured to include at least one functional unit realized to perform each predetermined process; and a decoder forming unit, configured to receive a connection control information corresponding to the bitstream, set a connection relationship of at least one functional unit included in the toolbox and control the functional unit(s) to be loaded onto the decoder solution.

The decoder forming unit can receive the datum from the parser and provide the datum to the decoding solution.

The decoding device can further include a dividing unit, configured to receive a decoder description, divide the received decoder description into the schema information and the connection control information and output the schema information and the connection control information, respectively.

The decoding solution can include a data interface, configured to receive the datum and provide the datum to a corresponding functional unit or allow the corresponding functional unit to read the datum.

The schema information can be information related to details of syntax information included in the bitstream and comprises at least one of a length, a meaning and an appearance condition of the syntax information and a repeated appearance frequency.

The schema information can be written by using an XML grammar.

The connection control information can be written by using a CAL markup language (CALML).

The toolbox can include subtoolboxes which are sets of the functional units distinguished according to an applied standard.

The decoding solution can include a working memory, configured to allow at least one functional unit to be loaded and operated.

The toolbox can be an element of the decoder forming unit.

A functional unit loaded onto the decoding solution can perform a predetermined process in which at least one of the datum and an output datum, outputted by a functional unit previously performing the process, is determined as an input datum.

To solve the aforementioned problems, another aspect of the present invention features a decoding method/an encoding method that can be universally used for various standards and/or a recorded medium recorded with a program for executing the method thereof.

According to an embodiment of the present invention, the decoding method can include (a) converting a bitstream to a meaningful datum to output the datum by using an inputted schema information; (b) setting a sequence of successive operations of functional units by using an inputted connection control information; and (c) allowing a bitstream decoding to be performed by the functional units by using the datum.

The (b) can be performed by setting a process performing sequence of at least one of a plurality of functional units included in a toolbox.

If a decoder description in which the schema information and the connection control information are integrated is inputted, dividing the inputted decoder description into the schema information and the connection control information and outputting the schema information and the connection control information, respectively, can be prior to the (a).

The schema information can be information related to details of syntax information included in the bitstream and comprises at least one of a length, a meaning and an appearance condition of the syntax information and a repeated appearance frequency.

The schema information can be the schema information is written by using an XML grammar.

The connection control information can be written by using a CAL markup language (CALML).

The functional unit can perform a predetermined process in which at least one of the datum and an output datum, outputted by a functional unit previously performing the process, is determined as an input datum.

According to another embodiment of the present invention, a recorded medium tangibly embodying a program of instructions executable by a decoding device to perform a decoding method, the recorded medium being readable by the decoding device, including converting a bitstream to a meaningful datum to output the datum by using an inputted schema information; setting a sequence of successive operations of functional units by using an inputted connection control information; and allowing a bitstream decoding to be performed by the functional units by using the datum.

Advantageous Effects

As described above, a bitstream decoding device and a method thereof in accordance with the present invention can decode a bitstream encoded in various types (syntax and semantics) in accordance with each standard (e.g. MPEG-1, MPEG-2, MPEG-4 and MPEG-4 AVC) by using the same information recognizing method.

Also, the present invention can parse a bitstream compressed in various methods by using the same information analyzing method and organically control each functional unit for the decoding by using the parsed data.

The present invention can commonly apply a syntax analyzing method for decoding various types of bitstreams.

The present invention can easily decode a bitstream when a syntax element is changed, added or deleted.

The present invention can allow some elements used to decode a bitstream to share the element information of analyzed syntax (i.e. a result from syntax parsing).

The present invention can allow the element information of analyzed syntax to be used to analyze the syntax element of a following bitstream.

The present invention can be used for the integration of a video or a still image performing the processing in units of blocks except for MPEG-1, MPEG-2, MPEG-4 and MPEG-4 AVC.

The present invention can group the functions constituting various decoding methods suggested by a variety of standards (or codec) according to each functional unit to put the grouped functions in a toolbox.

The present invention can selectively load some functional units necessary for a toolbox and perform the decoding in order to decode a bitstream encoded in various forms.

In addition, the present invention can change, add or delete the functional units equipped in a toolbox.

MODE FOR INVENTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, some embodiments of an integrated codec apparatus and a method thereof in accordance with an embodiment of the present invention will be described in detail with reference to the accompanying drawings. Identical or corresponding elements will be given the same reference numerals, regardless of the figure number, and any redundant description of the identical or corresponding elements will not be repeated.

Figure 1:
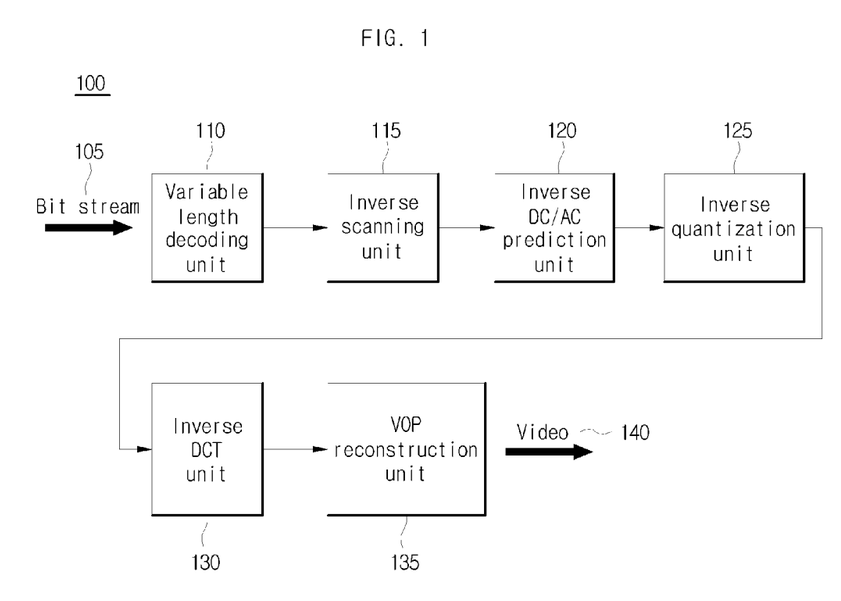
FIG. 1 shows a brief structure of a typical decoder.
Figure 2:
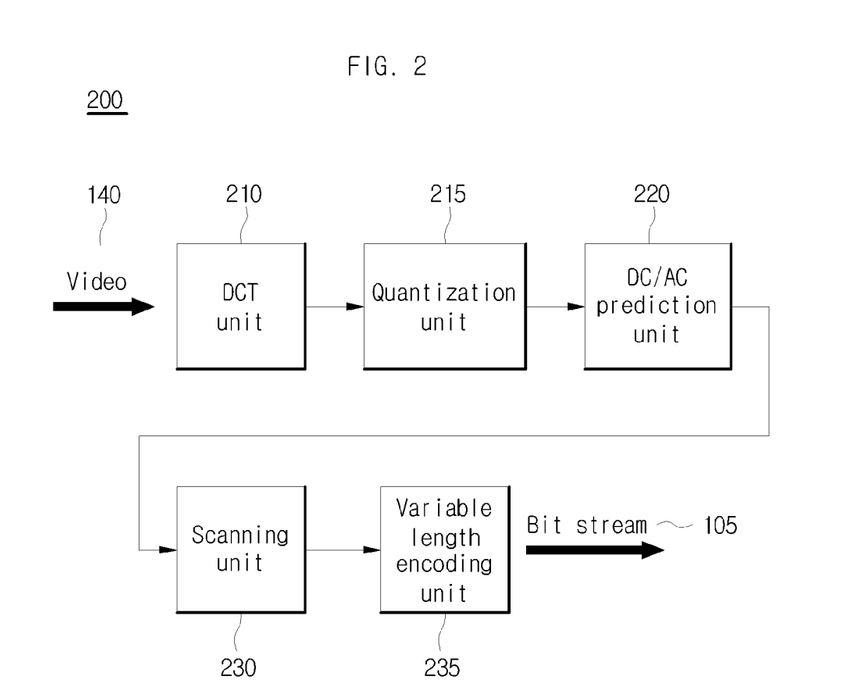
FIG. 2 shows a brief structure of a typical encoder.

FIG. 1 shows a brief structure of a typical decoder, and FIG. 2 shows a brief structure of a typical encoder.

As illustrated in FIG. 1, an MPEG-4 decoder 100 typically includes a variable length decoding unit 110, an inverse scanning unit 115, an inverse DC/AC prediction unit 120, an inverse quantization unit 125, an inverse discrete cosine transform unit 130 and a VOP reconstruction unit 135. It shall be evident that the decoder 100 can have a changeable structure depending on an applied standard and some elements can be replaced with different elements.

If a transferred bit stream is syntax-parsed and corresponding header information and image data are extracted, the variable length decoding unit 110 determines a quantized discrete cosine transform (DCT) coefficient by using a predetermined Huffman table and the inverse scanning unit 115 generates data having the same sequence as a corresponding video 140 by performing inverse scanning. In other words, the inverse scanning unit 115 outputs corresponding values in the inverse order of scanning by various methods. In the encoding, after the quantization is performed, a scanning direction can be determined depending on the distribution of a frequency range. Typically, the scanning method can be performed in a zigzag form. Alternatively, the scanning can be performed per codec in various ways.

Syntax parsing can be integratedly performed by the variable length decoding unit 110 or an element for processing a bitstream 105 prior to the variable length decoding unit 110. In this case, since the same standard is applied to the corresponding encoder and decoder, the syntax parsing is processed by a predetermined setting only, to correspond to the pertinent standard.

The inverse DC/AC prediction unit 120 determines the direction of a reference block for prediction by using the size of the DCT coefficient at a frequency band.

The inverse quantization unit 125 performs the inverse quantization of inversely scanned data. In other words, the inverse quantization unit 125 returns DC and AC coefficients by using a quantization parameter (OP) designated in an encoding process.

The inverse discrete cosine transform unit 130 evaluates an actual video data pixel value to generate a video object plane (VOP) by performing an inverse discrete cosine transform.

The VOP reconstruction unit 135 decodes a video signal by using the VOP generated by the inverse discrete cosine transform unit 130 and outputs the decoded signal.

As illustrated in FIG. 2, an MPEG-4 encoder 200 typically includes a discrete cosine transform unit 210, a quantization unit 215, a DC/AC prediction unit 220, a scanning unit 230 and a variable length encoding unit 235.

Each element included in the encoder 200 performs the inverse functions of the corresponding elements of the decoder 100. This is evident to any person of ordinary skill in the art. Briefly describing, the encoder 200 converts a video signal (i.e. a digital video pixel value) to a frequency value through the DCT and the quantization in order to performs the encoding. Then, the encoder 200 performs variable length encoding that differentiates the length of a corresponding bit according to the frequency of information to output it in a compressed bitstream format.

Figure 3:
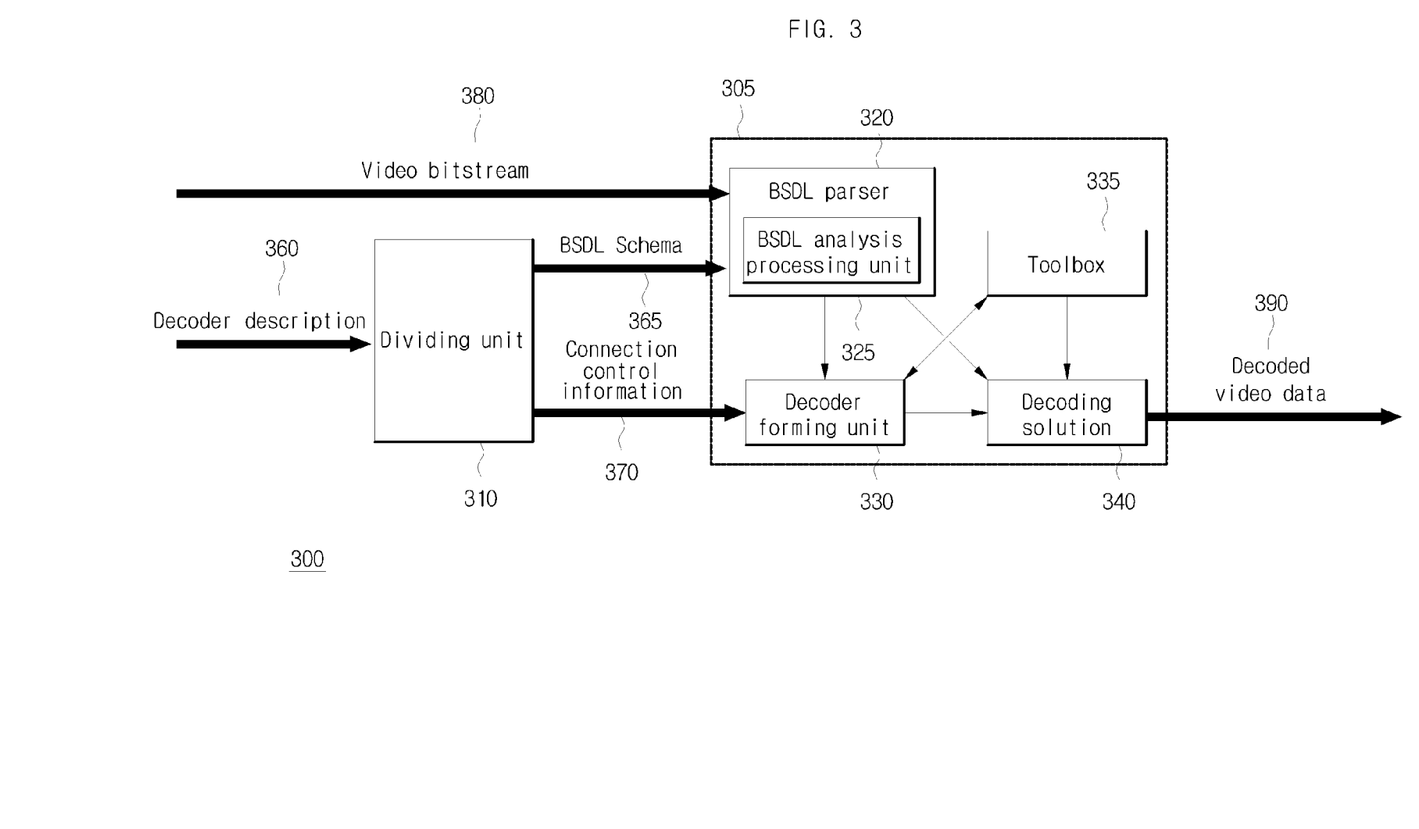
FIG. 3 shows a brief structure of a decoder in accordance with an embodiment of the present invention.
Figure 4:
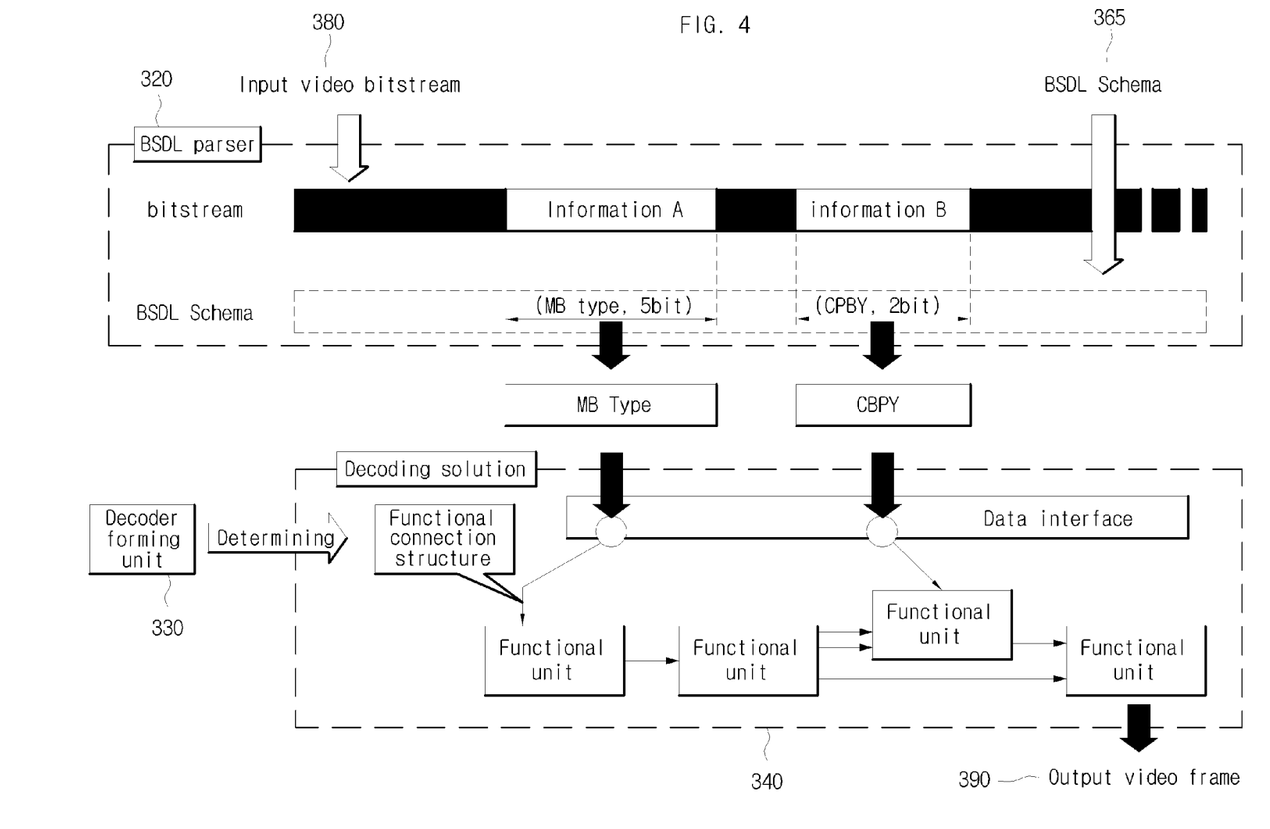
FIG. 4 shows a detailed bitstream processing operation of a decoding unit in accordance with an embodiment of the present invention.

FIG. 3 shows a brief structure of a decoder in accordance with an embodiment of the present invention, and FIG. 4 shows a detailed bitstream processing operation of a decoding unit in accordance with an embodiment of the present invention.

For example, the decoder description and a video bitstream of FIG. 3 may be generated and provided by an encoder.

Referring to FIG. 3, the decoder 300 includes a decoding unit 305 and a dividing unit 310. The decoding unit 305 includes a BSDL parser 320, a decoder forming unit 330, a toolbox 335 and a decoding solution 340.

The BSDL parser 320 analyzes syntax information of a video bitstream inputted from the outside by using a BSDL schema inputted from the dividing unit 310. The video bitstream inputted into the BSDL parser 320 is the data encoded by an encoding method (e.g. MPEG-4 and AVS). It shall be understood by any person of ordinary skill in the art that the BSDL parser 320 can analyze the BSDL schema by itself or the BSDL parser 320 can be formed by an external algorithm through this description.

The BSDL parser 320 include a BSDL analysis processing unit 325, which is an internal processing unit for re-defining the structure of the BSDL parser 320 by reading the BSDL schema written in an XML grammar.

The rule of re-defining it by using the BSDL schema is variable depending on a method applied by a maker. Accordingly, its basic aims are described as follows. A first aim is to allow information related to the length and meaning of the bitstream, written in the BSDL schema, to be recognizable. A second aim is to make a program-like routine actually operated by identical repeat or conditional sentence by reading a repeated structure and a conditional execution structure defined in the BSDL schema. Accordingly, it may be considerable that the BSDL parser 320 before being re-defined is in the state where the functions for accomplishing the aims are realized. The re-defining operation can refer to the operation of forming the BSDL parser 320 to be actually operated by using the foregoing parsing functions.

The BSDL parser 320 can be realized as a program making a fluid data flow by the control of the BSDL analysis processing unit 325. For example, the BSDL parser 320 can be realized by using a program language such as CAL (caltrop actor language), C, C++ and Java.

The BSDL analysis processing unit 325 and the BSDL parser 320 can be realized depending on a design reference of a decoder designer without any restriction. Of course, the developed BSDL application program such as BSDL reference software can be applied. The BSDL reference software is the official software made to smoothly operate the standardized BSDL by the MPEG. It shall be evident that the BSDL parser 320, which receives the BSDL schema, can also be realized easily by using the kind of software resources.

As described above in the description, the BSDL parser 320 can have the structure designed by various methods that a decoder designer selects. In other words, the decoder designer can selectively make the application and design of a detailed algorithm for allowing the BSDL parser 320 to perform designated functions. At this time, the BSDL parser 320 must be able to be re-defined by the result from the read BSDL schema, and the re-defined element must be also able to be in cooperation (e.g. communication) with other elements of the decoding unit 305.

The details of the syntax information included in the bitstream are written in the BSDL schema inputted into the BSDL parser 320. The details can include the length, meaning and appearance condition of the syntax information and a repeated appearance frequency. Here, the length of the syntax information refers to the length of bits occupied by certain information in the bitstream. The meaning of the syntax information shows what meaning the pertinent information has. This is because if a functional unit requests some information of A, for example, it may be necessary to distinguish which information is A. Also, even though the video bitstream of the same standard is processed by using one BSDL schema, it is changed depending on the attributes of the bitstream whether or how many times a part of the syntax information appears. To define this kind of case, the appearance condition and the repeated appearance frequency can be included in the BSDL schema. For example, the appearance condition may be necessary to allow motion vector information not to be read when an infra frame is processed, and if a pertinent macroblock is assumed to have 6 identical structural blocks, the repeated appearance frequency can be used to repeat the pertinent block.

As shown in FIG. 4, the BSDL analysis processing unit 325 helps the BSDL parser 320 to read the information included in the bitstream according to the sequence of designated by the BSDL schema by transferring result information of the analyzed details to the BSDL parser 230.

The BSDL parser 320 converts contents of the bitstream, which is inputted by referring to the result information provided from the BSDL analysis processing unit 325, to meaningful data in order to provide the meaningful data to the decoder forming unit 330 and/or the decoding solution 340. For example, the meaningful data, provided to the decoder forming unit 330 and/or the decoding solution 340, can include encoded video data of a predetermined macroblock size, an ACpred_flag for intra-encoded macroblocks, MB type & coded block pattern for chrominance (MCBPC) and a coded block pattern for luminance (CBPY). This data providing operation may be performed regardless of whether the decoder forming unit 330 or the decoding solution 340 is driven.

As described in the description, when the decoder decodes the bitstream by using the decoder description, the present invention is to allow the decoder description to be realized to have the structure using a BSDL system format or an XML based format that is linkable to the BSDL system. It shall be understood by any person of ordinary skill in the art that the decoder description can the XML format such as a BSDL and a CALML, and the BSDL schema and the CALML can have separated functions to be used for a syntax parsing operation and connection control between functional units, respectively.

The BSDL performs the writing in a form of an XML document or an XML schema including the information related to the structure and constituting method of the bitstream. The language is made to represent at least one video bitstream structure. Although the bitstream technology method that is being used through verification by the conventional MPEG standard is applied as it is, using the BSDL make it possible to be highly compatible with other technologies. Since the language format and grammar related to BSDL is described in the MPEG-B part 5, the pertinent detailed description will be omitted.

Below are examples of the constitutions of the BSDL schema and the connection control information using BSDL and XML. Of course, it is obvious that these examples are not limited to the structures of the BSDL schema and the connection control information.

BSDL schema

```
<xsd:element name="VideoObject">
 <xsd:complexType>
  <xsd:sequence>
   <xsd:element name="VOStartCode" type="m4v:StartCodeType"/>
   <xsd:element name="VOL">
*   <xsd:complexType>
     <xsd:sequence>
      <xsd:element name="header" type="VOLHeaderType"
       bs2:ifNext="&volSC;" rvc:port="0"/>
      <xsd:element name="VOP"
       type="VideoObjectPlaneType"
       maxOccurs="unbounded"
       bs2:ifNext="&vopSC;" rvc:port="1"/>
     </xsd:sequence>
    </xsd:complexType>
   </xsd:element>
  </xsd:sequence>
 </xsd:complexType>
</xsd:element>
Connection control information
<Network name="Decoder">
<Package>
<QID>
<ID id="MPEG4 Simple Profile" />
</QID>
</Package>
<Port kind="Input" name="BITSTREAM" />
<Port kind="Ouput" name="YUV" />
<Instance id="1">
<Class name="Parser">
<QID>
<ID id="c" />
</QID>
</Class>
<Note kind="label" name="Stream Parser" />
</Instance>
<Instance id="2">
<Class name="VS">
<QID>
<ID id="c" />
</QID>
<Note kind="label" name="Video Session" />
</Class>
</Instance>
```

-continued

BSDL schema

```
<Connection src="" src-port="BITSTREAM" dst="1" dst-
port="BITSTREAM" />
    <Connection src="1" src-port="CSCI" dst="2" dst-port="CSCI" />
    <Connection src="1" src-port="DATA" dst="2" dst-port="DATA" />
    <Connection src="2" src-port="YUV" dst="" dst-port="YUV" />
</Network>
```

The description is on the assumption that some information such as decoder description 360 and encoded video data 380 is inputted from the outside. Alternatively, it is obvious that at least one of the decoder description 360 and the encoded video data 380 is already stored at an element of the decoding unit 305.

Referring to FIG. 3 again, the decoder forming unit 330 controls the decoding solution 340 to be realized by using the connection control information inputted from the dividing unit 310 and some of the bitstream data inputted from the BSDL parser 320 (e.g. at least one of encoded video data of a predetermined macroblock size, an ACpred_flag for intra-encoded macroblocks, MB type & coded block pattern for chrominance (MCBPC) and a coded block pattern for luminance (CBPY)).

In other words, the decoder forming unit 330 controls some or all functional units of the toolbox 335 to be loaded and arranged in the decoding solution with being organically connected with each other by using the connection control information. Here, the connection control information is written by using a CAL markup language (CALML). The CALML is the XML format capable of writing the constitution of a decoder by using the caltrop markup language, which has currently been disputed by the MPEG standard committee. The caltrop markup language is constituted to include a program object, Actor, and connection relationships between each Actor. The CALML is the caltrop markup language which is expressed by the XML format. An example of the CALML has already shown above as the examples of the BSDL schema and the connection control information.

In particular, the decoder forming unit 330 has an authority to access the toolbox 335 including the sets of various functional units. The decoder forming unit 330 also sets the input and output connection between the functional units of the toolbox 335 and forms the decoding solution 340 as the set result. At this time, the input and output connection structure and executing sequence between the functional units is determined by referring to the connection control information. The decoder forming unit 330 can receive some information for recognizing the type of the inputted bitstream from the BSDL parser 320 and refer to the received information in a functional unit connecting operation. If all connection structures of functional units are determined, in case that data is expected to be continuously inputted from the outside, the connection structure may be considered as an independent decoder, capable of analyzing and decoding all types of video bitstreams intended by a maker. At this time, this completed functional connection structure may be referred to as the decoding solution 340.

The toolbox 335 includes a plurality of functional units, each of which is realized to perform a predetermined process. Each of the functional units can be realized as a combination of program codes.

Each functional unit included in the toolbox 335 can be segmentalized into a plurality of subtoolboxes divided by using each applied usage set. For example, each functional unit can be segmentalized into a first toolbox including the functional unit for MPEG and a second toolbox including other functional units. Alternatively, each functional unit can be segmentalized into a first toolbox as a set of the functional units for MPEG-2, a second toolbox as a set of the functional units for MPEG-4 and a third toolbox as a set of the functional units for AVS, which is a digital TV compression standard in China.

Of course, a plurality of toolboxes 335 can have an independent connection relationship with the decoder forming unit 330 and the decoding solution 340. In this case, the toolboxes 335 can be realized as the foregoing independent toolboxes such as the first toolbox and the second toolbox, which are not shown.

For the convenience of describing, the below description focuses on the case that one toolbox 335 includes a plurality of subtoolboxes or all functional units are included by being scattered without being grouping into sets.

The toolbox 335 includes the functional units realized to perform each function (i.e. a predetermined process). Each functional unit forms successive connecting operation relationships by being loaded onto the decoding solution 340 by the connection control of the decoder forming unit 330, to thereby output the encoded video data included in the video bitstream to decoded video data.

For example, the toolbox 335 can include a de-blocking filtering (DF) functional unit, a VOP reconstructing (VR) functional unit, a frame field reordering (FFR) functional unit, an intra prediction and picture reconstruction (IPR) functional unit, an inverse transform (IT) functional unit, an inverse quantization (IQ) functional unit, an inverse AC prediction (IAP) functional unit, an inverse scanning (IS) functional unit and a DC reconstruction (DCR) functional unit.

An IT 4×4 functional unit, an IQ 4×4 functional unit and a DCR 4×4 functional unit process the blocks having the size of 4×4. This is because although MPEG-1/2/4 process data in 8×8 block size in the transform, quantization and prediction, MPEG-4 AVC may process data in 4×4 block size.

It is obvious that the toolbox 335 can include any functional unit for performing a data decoding function regardless of an applied standard, a necessary functional unit for the developed technology can be added, an existing functional unit can be modified and an unnecessary functional unit can be deleted. For example, in the case of additionally needing the IS functional unit processing data in 4×4 block size to perform the decoding, the pertinent functional units can be included in the toolbox 335. Also, a special prediction (SPR) functional unit can be added to perform the intra prediction for the MPEG-4 AVC.

It is obviously possible to combine the functional units that are commonly applicable by a plurality of standards among each functional unit of the toolbox 335. Below is briefly described each function of the functional units which is evident to any person of ordinary skill in the art.

The DF functional unit is a de-blocking filter of MPEG-4 AVC, and the VR functional unit stores a decoded pixel value.

The FFR functional unit is for an interlaced mode, and the IPR functional unit performs the intra prediction of MPEG-4 AVC and then stores a decoded pixel value. As described above, the intra prediction of MPEG-4 AVC can be performed by the SPR functional unit.

The IT functional unit performs the inverse transform of DC values and AC values, and the IQ functional unit performs the inverse quantization of the AC values.

The IAP functional unit performs the inverse AC prediction of the AC values, and the IS functional unit performs the inverse scan of the AC values. The DCR functional unit performs the inverse AC prediction and the inverse quantization of the DC values.

The decoding solution 340, which is formed by the decoder forming unit 330, receives the bitstream data (or encoded video data of a predetermined macroblock size) divided in a unit of syntax information by the BSDL parser 320.

As described above, the bitstream can be inputted through a tangible or intangible data interface for inputting and outputting data. In the case of software, the data interface can be a memory buffer, a virtual port determining the flow of data or a parameter of a program. In the case of hardware, the data interface can be a connection line of a circuit. Alternatively, the data interface can be realized in various ways.

The data can be continuously inputted through a pertinent interface regardless of the process performed by a certain functional unit (e.g. in order to perform the parallel processing). The decoding solution 340 processes the inputted data and outputs it as decoded video data. As shown in FIG. 4, data can be transferred from the data interface to each functional unit, and the functional unit can process the pertinent data and transfer the processed data to a following functional unit. All flow of data can be determined as pre-determined by the decoder forming unit 330.

The decoding solution 340 can include a storing unit for storing the data provided from the BSDL parser 320 (e.g. information extracted by the syntax parsing of a bitstream) and processing-resulted data of each functional unit. Each functional unit loaded by the control of the BSDL parser 320 can perform a predetermined process by using at least one of the data provided from the BSDL parser 320 and the resulted data of a previously operated functional unit. In this case, a following functional unit performing the corresponding process must recognize that the operation of the previous functional unit is completed. Herein, the decoder forming unit 330 can control whether the following functional unit starts the operation by continuously monitoring whether each functional unit completes the operation. Also, if the storing unit includes independent areas per each functional unit and the processing-resulted data of the previous functional unit is allowed to be stored in the area for the following functional unit by the control of the decoder forming unit 330, the following functional unit can perform the process immediately when the data necessary to perform the process is stored in the area. Alternatively, it is obviously possible that various methods for controlling a processing start time between the functional units are additionally considered.

Of course, the pertinent storing unit can be equipped in the decoder forming unit, and the decoder forming unit 330 can provide a functional unit to perform the current process with the data provided from the BSDL parser 320 (e.g. information extracted by the syntax parsing of a bitstream) and the processing-resulted data of each functional unit.

Hereinafter, the operation of the decoding unit 305 will be briefly described with reference to FIG. 4.

If a bitstream of an input image and a BSDL schema is inputted (and it is assumed that there is information A and information B at areas of the bitstream), the BSDL parser 320 recognizes that there are MB type data and 2-bit CBPY data at the areas corresponding to the information A and the information B, respectively, by reading the BSDL schema.

Then, the BSDL parser 320 reads bits in predetermined quantities that are designated in each area by using the received information and transfer the read information to the decoding solution according to given meanings.

The decoding solution 340 receives the data named as MB type and CBPY from the BSDL parser 320 to process the data. As described above, the decoding solution 340 is realized by allowing each functional unit to be loaded by the connection control of the decoder forming unit 330.

The data interface of the decoding solution 340 receives the data transferred from the outside and transfers the received data to the functional units requesting the pertinent data by referring to a connection relationship of the functional units previously formed by the connection control information.

Each functional unit also performs the decoding operation according to the predetermined connection relationship (i.e. the connection relationship for processing data). All data flow and the connection relationship between the functional units depend on the details previously formed by the decoder forming unit 330. An output video frame is outputted by the successive processing of each functional unit.

As described above, the decoder forming unit 330 and/or the decoding solution 340 can include a storing unit. This is to prevent the cease of the operation allowing the data to be transferred from the BSDL parser 320. This is also because the data can be provided in parallel for the decoding operation. Accordingly, each functional unit can read desired data from the storing unit to use the read data.

The BSDL parser 320 can provide corresponding data to the decoder forming unit 330 to perform the decoding of encoded video data in order to allow the decoder forming unit 330 to provide the data to the decoding solution 340. Alternatively, the BSDL parser 320 can directly provide the pertinent data to the decoding solution 340.

Referring to FIG. 3 again, the dividing unit 310 divides the inputted decoder description 360 into each information to input the divided information into decoding unit 305. The decoder description 360 inputted into the dividing unit 310 can include the BSDL schema 365 for writing the structure of a bitstream and the CALML data for writing the decoding operation of a bitstream. The aforementioned two types of data can be independently written by the XML grammar or integrated and transmitted for the efficient operation of a decoder.

Figure 5:
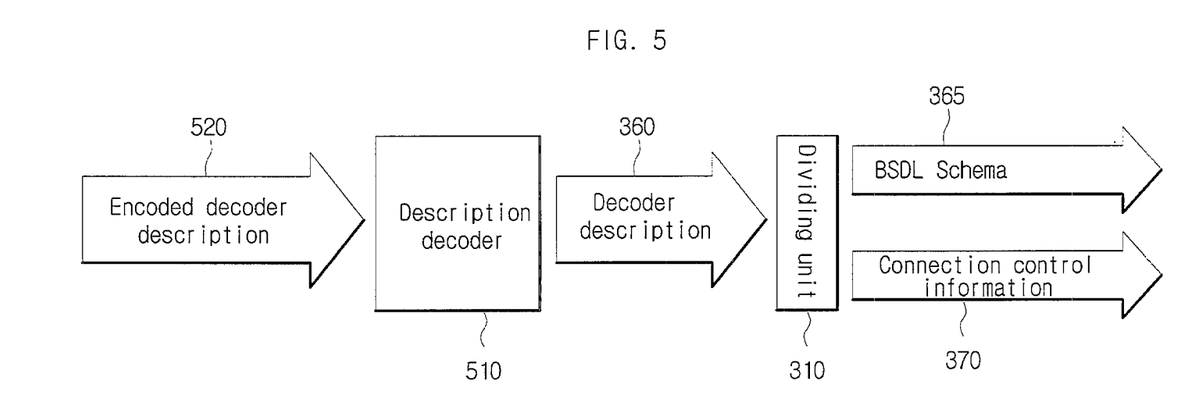
FIG. 5 shows a decoder description input operation in accordance with another embodiment of the present invention.

FIG. 5 shows a decoder description input operation in accordance with another embodiment of the present invention.

As shown in FIG. 5, the decoder 300 can further include a description decoder 510. The description decoder 510 can generate the decoder description 360 by decoding an inputted encoded decoder description 520 in order to provide the generated decoder description 360 to the dividing unit 310.

Transmitting and receiving the encoded decoder description 360 makes it possible to reduce the amount of the transmitted and received data.

Figure 6:
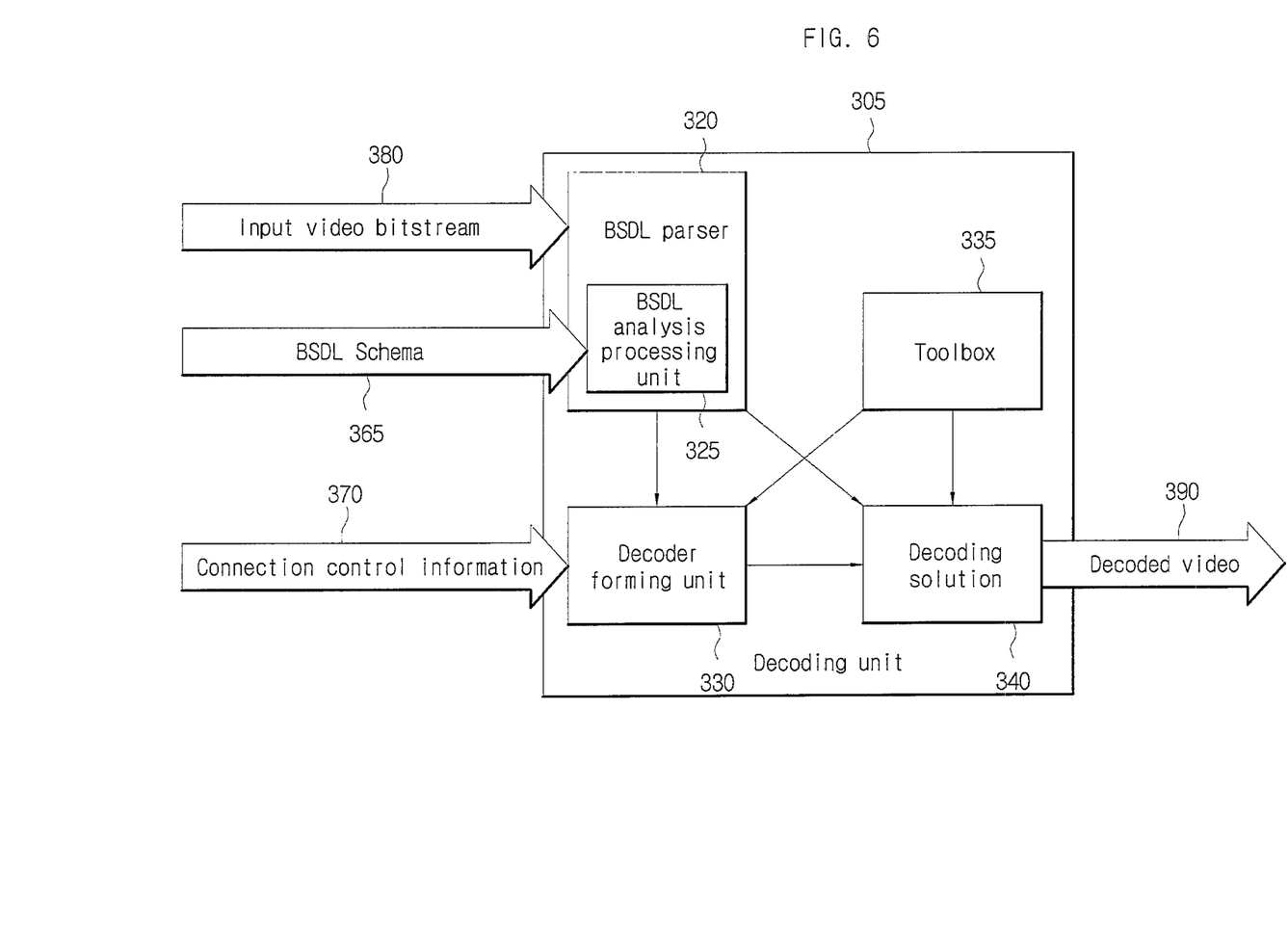
FIG. 6 shows a decoder description input operation in accordance with another embodiment of the present invention.

FIG. 6 shows a decoder description input operation in accordance with another embodiment of the present invention.

The above description with reference to FIG. 3 is related to the case that the decoder description 360 and the video bitstream are inputted into the decoding unit 305. The above description with reference to FIG. 5 is related to the case that the encoded decoder description 520 and the video bitstream 380 are inputted into the decoding unit 305.

However, as shown in FIG. 6, it is obvious that configuration information of the decoder description 360 can be initially divided and inputted into the decoding unit 305. In this case, the foregoing separating 310 and decoder description 360 can be obviously emitted.

Figure 7:
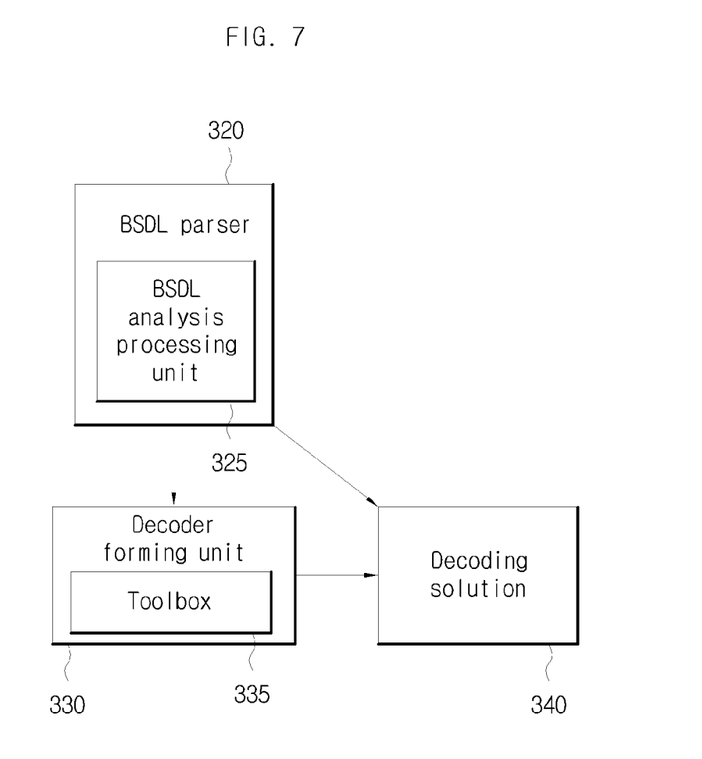
FIG. 7 shows the structure of a decoding unit in accordance with another embodiment of the present invention.

FIG. 7 shows the structure of a decoding unit in accordance with another embodiment of the present invention.

The above description with reference to FIG. 3 through FIG. 6 is related to the decoding unit 305 having the toolbox 335 and the decoder forming unit 330, which are separated from each other.

However, as shown in FIG. 7, it is obvious that the decoder forming unit 330 can include the toolbox 335 as an element.

In this case, the decoder forming unit 330 can perform not only the control operation of the connection structure between the functional units but also the selecting operation of a functional unit to be used. This may make it possible to realize decoding solution 340 in various types.

Figure 8:
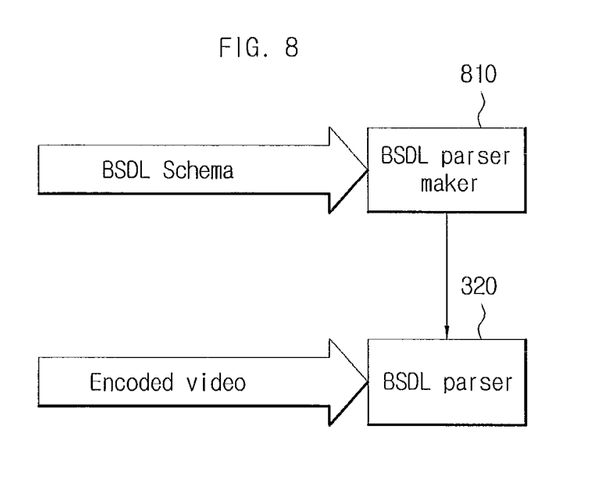
FIG. 8 shows the structure of a BSDL parser in accordance with another embodiment of the present invention.

FIG. 8 shows the structure of a BSDL parser in accordance with another embodiment of the present invention.

The above description with reference to FIG. 3 is related to the BSDL parser 320 including the BSDL analysis processing unit 325.

However, the BSDL parser 320 of the present invention can be previously defined from the outside of the decoder 300 before starting the decoding of the bitstream. Accordingly, the aforementioned BSDL analysis processing unit 325 can be omitted. At this time, a BSDL parser maker 810 can be configured by using the existing application program such as a BSDL reference software.

The below description focuses on the case that a BSDL parser as an independent element performs a predetermined operation. Alternatively, the BSDL parser can be realized as one functional unit included in a toolbox or pre-included as an independent element in a decoding solution. If the BSDL parser is equipped in the toolbox, a decoder forming unit must load and control the BSDL parser to perform the process by using connection control information before the functional units performing the bitstream decoding is operated. Similarly, if the BSDL parser pre-includes in the decoding solution, the decoder forming unit must control the BSDL parser to perform the process before each loaded functional unit starts to perform the process. In each of the above cases, the operations and functions of the BSDL parser is the same as described above with reference to FIG. the related drawings. Accordingly, the pertinent detailed description will be omitted. However, it may be necessary that the decoder forming unit or/and the decoding solution receives the BSDL schema or/and the bitstream at the first time.

As described above, the decoding device and the method thereof in accordance with the present invention makes it easy to analyze a syntax element and control the connection of the functional units in one standard (or codec) or between different standards (or codecs). In other words, it is possible to change the sequence of syntax elements in the bitstream to be generated according to a certain standard, to insert a new syntax element or to delete the existing syntax elements.

In accordance with the conventional art, the decoder is unable to normally decode a pertinent bitstream when a syntax element is manipulated. For example, if the corresponding bitstream is re-formed and transmitted by changing the sequence of the bitstream information from ABC to ACB, the decoder is not able to recognize the re-formed bitstream. This makes it impossible to normally decode the re-formed bitstream. Similarly, if the bitstream is re-formed as ABFC by newly inserting F or as AC by deleting B, the decoder is also not able to recognize the re-formed bitstream.

However, using the decoding device and the method thereof in accordance with the present invention can allow the decoder description information to be included in an expanded bitstream or to provide the decoder description information as independent data, the decoder 300 can smoothly permit decoding operation.

Hitherto, the syntax analyzing method for the bitstream decoding and the decoding device in accordance with the present invention has been described based on the MPEG-4 AVC. However, it is naturally that the present invention can be identically applied to the MPEG-1, MPEG-2, MPEG-4 and other video data encoding/decoding standards without any restriction.

Similarly, it is obvious that the information included in the connection control information can be also written as information for performing the decoding by a plurality of standards, instead of being written by using only information related to connection relationships between the functional units for performing the decoding by one standard and the processing operation requested for the pertinent functional unit.

For example, it is assumed that a plurality of initial frames of a video bitstream, a plurality of following frames and other frames are encoded in MPEG-2, MPEG-4 and MPEG-1, respectively. In this case, in order to decode an encoded video data, the connection control information is obviously defined such that the functional units conforming to each standard included in the toolbox 335 can be organically coupled in order to each frame encoded by using different encoding methods.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

INDUSTRIAL APPLICABILITY

The present invention is applicable to a video codec.

The invention claimed is:
1. A device, comprising:
a boundary scan description language (BSDL) processor in a parser;
a decoding device including the parser, a toolbox, a decoder forming device, and a decoding solution device;
a dividing device not included in the decoding device, the dividing device being configured to:
  receive a decoder description,
  divide the received decoder description into BSDL schema information and connection control information, and
  output the BSDL schema information and the connection control information via separate outputs to the parser and the decoder forming device, respectively;
the parser configured to:
  receive a bitstream,
  receive the BSDL schema information for analyzing the bitstream,
  convert, via the BSDL processor, the bitstream to a datum according to the BSDL schema information, and
  output the datum;
the toolbox including at least one functional unit, the at least one functional unit being software instructions configured to perform a predetermined process;
the decoder forming device configured to:
  receive connection control information corresponding to the bitstream, and
  set a connection relationship of the at least one functional unit included in the toolbox;

the decoding solution device including a working memory; and the decoding device configured to load the at least one functional unit from the toolbox into the working memory in the decoding solution device, and decode the datum via the at least one functional unit.

2. The device of claim 1, wherein the decoder forming device receives the datum from the parser and provides the datum to the decoding solution.

3. The device of claim 1, wherein the decoding device comprises a data interface configured to receive the datum and provide the datum to the at least one functional unit or allow the at least one functional unit to read the datum.

4. The device of claim 1, wherein the BSDL schema information is information related to details of syntax information included in the bitstream and comprises at least one of a length, a meaning and an appearance condition of the syntax information and a repeated appearance frequency.

5. The device of claim 1, wherein the BSDL schema information is written by using an XML grammar.

6. The device of claim 1, wherein the toolbox includes subtoolboxes which are sets of functional units distinguished according to an applied standard.

7. The device of claim 1, wherein the toolbox is an element of the decoder forming device.

8. The device of claim 1, wherein the at least one functional unit performs the predetermined process so that at least one of the datum and an output datum, output by a functional unit previously performing the process, is determined as an input datum.

9. A decoding method, comprising:
providing a boundary scan description language (BSDL) processor in a parser;
providing a decoding device including the parser, a toolbox, a decoder forming device, and a decoding solution device;
providing a dividing device not included in the decoding device;
if a decoder description in which BSDL schema information and connection control information are integrated is input, dividing, by the dividing device, the input decoder description into the BSDL schema information and the connection control information and outputting the BSDL schema information and the connection control information via separate outputs;
converting, by the BSDL processor in the parser, a bitstream to a datum according to the BSDL schema information and outputting, by the parser, the datum;
setting, by the decoder forming device, a connection relationship of at least one functional unit included in the toolbox, the at least one functional unit being software instructions configured to perform a predetermined process;
loading, by the decoding device, the at least one functional unit from the toolbox into a working memory in the decoding solution device; and
decoding, by the decoding device, the datum via the at least one functional unit.

10. The decoding method of claim 9, wherein the at least one functional unit is one of a plurality of functional units in the toolbox, and
wherein the setting step is performed by setting a process performing sequence of the plurality of functional units.

11. The decoding method of claim 9, wherein the BSDL schema information is information related to details of syntax information included in the bitstream and comprises at least one of a length, a meaning and an appearance condition of the syntax information and a repeated appearance frequency.

* * * * *

UNITED STATES PATENT AND TRADEMARK OFFICE
CERTIFICATE OF CORRECTION

PATENT NO. : 8,582,661 B2  
APPLICATION NO. : 12/580867  
DATED : November 12, 2013  
INVENTOR(S) : Jang et al.

Page 1 of 1

It is certified that error appears in the above-identified patent and that said Letters Patent is hereby corrected as shown below:

IN THE SPECIFICATION:

Column 1, lines 17-18, change "BSDL (boundary scan description language)" to --BSDL (bitstream syntax description language)--.

IN THE CLAIMS:

Claim 1, Column 14, line 39, change "a boundary scan description language (BSDL)" to --a bitstream syntax description language (BSDL)--.

Claim 9, Column 15, line 30, change "a boundary scan description language (BSDL)" to --a bitstream syntax description language (BSDL)--.

Signed and Sealed this  
Third Day of March, 2015

Michelle K. Lee  
*Deputy Director of the United States Patent and Trademark Office*